United States Patent Office 3,270,054
Patented August 30, 1966

3,270,054
ADAMANT-1-YL- AND HOMOADAMANT-1-YL-OXY-, -THIO- AND AMINO GUANIDINE DERIVATIVES
Andre R. Gagneux and Franz Hafliger, Basel, Switzerland, assignors to Geigy Chemical Corporation, Greenburgh, N.Y., a corporation of Delaware
No Drawing. Filed July 22, 1965, Ser. No. 474,177
Claims priority, application Switzerland, July 31, 1964, 10,072/64
6 Claims. (Cl. 260—564)

The present invention concerns processes for the production of new guanidine derivatives as well as these compounds themselves and their salts with inorganic and organic acids.

More particularly the invention relates to novel guanidine derivatives of the formula

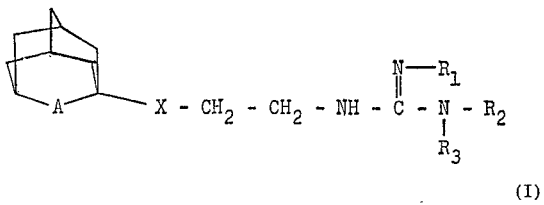

(I)

wherein

A represents methylene or ethylene,
X represents oxygen, sulfur, imino or lower alkylimino,
$R_1$, $R_2$ and $R_3$ represent hydrogen or at most two of these three symbols represent lower alkyl, which compounds as well as their salts with inorganic and organic acids have valuable pharmocological properties; especially, they have sympathicolytic activities which render them useful as experimental agents in the control of hypertension in mammals. In addition they have antiviral activity. No tests on humans have thus far been carried out.

The sympathicolytic properties of the aforesaid novel compounds according to the invention can be demonstrated, for example, during and after intravenous infusion in cats anesthetized with Numal in the light of the response of the blood pressure to injections of 2γ/kg. i.v. of noradrenaline or of 1 mg./kv. i.v. of tyramine repeated at certain intervals. During the infusion of N-[β-(adamant-1-yloxy)-ethyl]-guanadine (A) (a total of 12 mg./kg. i.v. within 2 hours) the pressor effect of the amine noradrenaline having a direct action is potentiated. On the other hand, the pressor effect of the amine tyramine, which acts indirectly, i.e. by depletion of noradrenaline from the reservoirs of the peripheral synapses, is reduced during the infusion. This corresponds to the so-called cocaine effect which can be explained by the protection of the noradrenaline reservoirs. During the infusion of N-[β(adamant-1-ylamino)-ethyl]-guanidine (B) (dosage and duration as for compound A), the pressor effect of noradrenaline as well as that of tyramine is potentiated. Maximum potentiation with the two substances is not simultaneous. The noradrenaline potentiation reaches its maximum after 150 minutes with the cessation of the tyramine potentiation which is at its most marked after 90 minutes. This indicates a cocaine effect which is overlapped by a copious depletion of noradrenaline (depletion of NA) similar to the effect of reserpine. Unlike the above findings, during the infusion of N-[β-(adamant-1-ylthio)-ethyl]-guanidine (C), both the pressor effect of noradrenaline having a direct action and that of tyramine having an in-direct action, are reduced. The weakest reaction to either amine is established after 150 minutes.

The course of this action indicates a direct adrenolytic activity on the receptors which can be clearly distinguished from the effects of compounds A and B to the noradrenaline reservoirs.

In the compounds of the general Formula I, a low alkylimino group X, is, e.g. a methylimino or ethylimino group. The symbols $R_1$ to $R_3$, as low alkyl radicals, represent in particular methyl or ethyl radicals.

To produce the guanidine derivatives of the general Formula I, an amine of the general Formula II

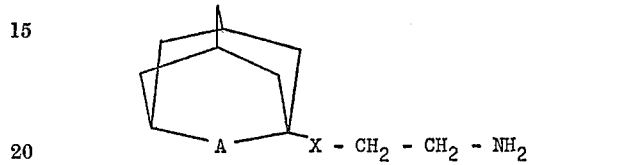

(II)

wherein A and X have the meanings given above, is reacted with a compound of the general Formula III

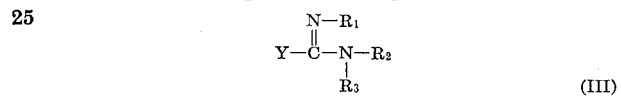

(III)

wherein Y represents a radical which can be split off, in particular a low alkylthio or alkoxy radical, the nitroso-amino radical (ON—NH—) or a substituted 1-pyrazolyl radical such as the 3,5-dimethyl-1-pyrazolyl radical, and $R_1$, $R_2$ and $R_3$ have the meanings given above, or with an acid addition salt of the same, and, if desired, the base is liberated from the salt obtained as intermediate reaction product and, if desired, the free base is converted into a salt with another inorganic or organic acid.

As starting materials of the general Formula III S-methylisothiourea and N-alkyl derivatives of the same in the form of mineral acid, especially sulphuric acid salts, are particularly suitable. Further examples are O-methyl-isourea sulphate and N-alkyl derivatives of the same as well as nitroso-guanidine. The reaction is performed, for example, in water or in a water soluble organic solvent, e.g. in a low alkanol such as methanol, ethanol, propanol, isopropanol, in an ethereal liquid such as dioxan, tetrahydrofuran or diethylene glycol dimethyl-ether, in a ketone such as acetone or butanone, in a low alkanoic acid such as acetic acid or in a low aliphatic amide such as formamide or dimethyl formamide, or in mixtures of such solvents with water. The reaction is performed preferably while heating to at most the boiling point of the reaction medium used.

The starting materials of the general Formula I can be produced in various ways starting from known adamantane- and homologous tricyclo[4.3.1.1³·⁸]undecane derivatives (homoadamantane derivatives). For example, first 1-bromo-adamantane is heated with an alkyl ester of glycolic acid or mercaptoacetic acid in the presence of an acid binding agent, such as, e.g. collidine, or an alkyl ester of a halogen substituted acetic acid or a arylsulphonyloxyacetic acid, in particular of bromo-acetic acid or p-toluene-sulphonyloxyacetic acid, with an alkali metal compound of 1-adamantanol or 1-adamantanthiol. The adamant-1-yloxy)-acetic acid alkyl ester or (adamant-1-ylthio)-acetic acid alkyl ester obtained in both cases is converted in the usual manner into the corresponding amide or low N-alkyl-amide and the latter is reduced, e.g. by means of lithium aluminum hydride in an ether or ethereal solvent such as, e.g. diethylether or tetrahydrofuran, to amines of the general Formula II. Also the amides, for example, of β-(adamant-1-yl-oxy)- or β-

(adamant-1-ylthio)-propionic acid can be subjected to Hofmann degradation or alkyl esters of β-(adamant-1-yloxy)- or β-(adamant-1-ylthio)-propionic acid can be converted into the corresponding azides and the latter degraded according to Curtius. To produce the starting materials of the general Formula II having the imino group or a low alkylimino group as X, 1-adamantane amine or an N-alkyl-1-adamantane amine, for example, is first acylated with halogen substituted acetyl halide and the 1-(halogenoacetyl)-amido-adamantane obtained is reacted either with an alkali metal azide or with ammonia. By reducing the resulting 1-(azidoacetyl)-amidoadamantane or 1-(glycine)-amidoadamantane formed, which may contain a low alkyl radical at the amide nitrogen atom, by means of lithium aluminum hydride the desired starting materials of the general Formula II are obtained.

The reaction of 1-adamantane amine or of metal compounds of 1-adamantanol or 1-adamantane-thiols with chloro- or bromo-acetonitrile, and the subsequent reduction of the nitriles obtained, e.g. by means of lithium aluminum hydride, is mentioned here as another example of the various further possibilities for the production of starting materials of the general Formula II.

Starting with 3-bromo-, 3-chloro- or 3-hydroxy-tricyclo-[4.3.1.1$^{3,8}$]undecane respectively, the homologous starting materials of the general Formula II, wherein A represents the ethylene group, are obtained by the syntheses mentioned.

According to a second process, which is related to the process first given, an amine of the general Formula II defined above or an acid addition salt, in particular a mineral acid salt thereof, is reacted with a cyanamide of the general Formula IV

(IV)

wherein $R_2$ and $R_3$ have the meanings given above. Naturally, compounds are formed of the general Formula I having a hydrogen atom as $R_1$. The reaction can be performed in the absence or presence of solvents, such as e.g. a low alkanol and, if necessary, completed by heating. Also a mineral acid, for example, may be chosen as reaction medium, such as, e.g. concentrated hydrochloric acid.

As starting material of the general Formula IV may be considered cyanamide, N-methyl- and N,N-dimethyl-cyanamide.

Whereas in the above two reactions, an amine containing the adamantyl- or tricyclo[4.3.1.1$^{3,8}$]undecyl radical (homoadamantyl radical) is reacted with a carbonic acid derivative, conversely certain carbonic acid derivatives of amines of the general Formula II can also be reacted with ammonia or with a low mono- or dialkylamine. Thus, compounds of the general Formula I are produced by a third process by reacting a compound of the general Formula V

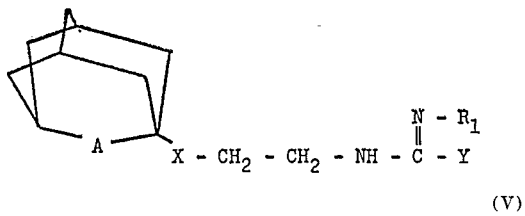

(V)

wherein A, X, $R_1$ and Y have the meanings given in general Formulae I and III resp., or an acid addition salt thereof with a compound of the general Formula VI

(VI)

wherein $R_2$ and $R_3$ have the meanings given for general Formula I. The reaction can be performed substantially under the conditions given for the first process. In this case, the radical Y which can be split off, is particularly a methylthio or methoxy radical, but it may also represent, for example, the mercapto or hydroxy group; i.e. starting materials of the general Formula V are, e.g. methyl isothiourea ethers, methyl isourea ethers or also the corresponding thioureas or ureas shown here in the isoform. These are obtained, e.g. by reacting amines of the general Formula II with thiocyanic acid or with a low alkylisothiocyanate or with cyanic acid or a low alkylisocyanate. Ureas of the general Formula V are also formed if the Curtius degradation process mentioned as production process for amines of the general Formula II is only performed up to the step of the isocyanate and the latter is reacted with ammonia or a low alkylamine. The S- or O-alkyl derivatives, respectively, are obtained in the usual way from the thioureas and ureas by treatment with alkylating agents in the presence of alkali hydroxides. In every case, the reaction component of the general Formula VI can be ammonia or a low alkylamine and, if $R_1$ in the reaction component of the general Formula V is hydrogen, also a low dialkylamine.

A fourth process for the production of compounds of the general Formula I is characterized by reacting an amine of the general Formula I given above, or an acid addition salt, in particular a mineral acid salt, thereof with a cyanamide of the general Formula VII

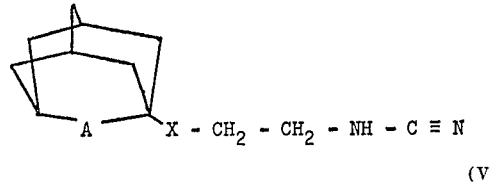

(VII)

wherein A and X have the meanings given above for general Formula I. The reaction can, for example, be performed under the conditions indicated in the second process. In the compounds obtained of the general Formula I, $R_1$ is always hydrogen; starting materials of the general Formula VI can be both ammonia and low alkylamines as well as low dialkylamines.

Starting materials of the general Formula VII are formed, for example, by reacting cyanogen bromide or cyanogen chloride with amines of the general Formula II given further above.

Further, compounds of the general Formula I are also obtained by splitting, by reduction or hydrolysis of compounds of the general Formula VIII

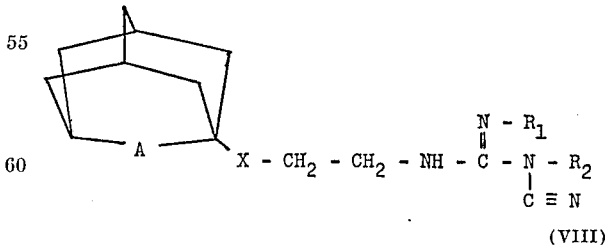

(VIII)

wherein A, X, $R_1$ and $R_2$ have the meanings given for general Formula I. The former can be performed, for example, by electrolytic reduction at a cathode such as a lead cathode, the latter being carried out, for example, by heating with dilute sulphuric acid, whereby the corresponding guanyl urea (dicyanodiamidine) is formed from the dicyanodiamide derivative of the Formula VIII.

Starting materials of the general Formula VIII are formed e.g. on reacting mineral acid salts of amines of the general Formula II with the sodium compounds of the dicyanodiamide or alkyl-substituted dicyanodiamides while heating, e.g. in boiling butanol.

Compounds of the general Formula I are also obtained by partially hydrolysing compounds of the general Formula IX

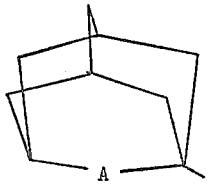
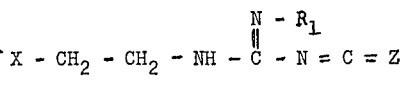

(IX)

wherein Z represents oxygen or sulphur, and A, X and $R_1$ have the meanings given for general Formula I. This partial hydrolysis can be performed, for example, in an acid aqueous medium such as dilute sulphuric acid, in the cold or, if necessary, with heating. In the resulting compounds of the general Formula I, $R_2$ and $R_3$ represent hydrogen.

Starting materials of the general Formula IX can be obtained, for example, by reacting the cyanamides mentioned above of the general Formula VII, with salts, in particular alkali metal salts of cyanic acid or thiocyanic acid in a neutral medium, e.g. in the presence of water.

Compounds of the general Formula I can also be obtained by reducing or reductively desulphurising guanidides of carboxylic acids or thiocarboxylic acids of the general Formula X

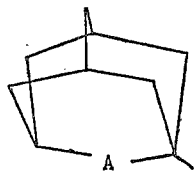
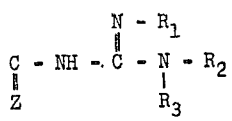

(X)

or guanidinoacetic acid amides or thioamides of the general Formula XI

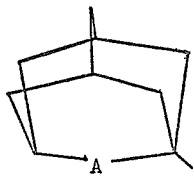
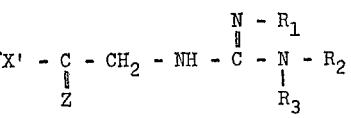

(XI)

wherein X' represents the imino or a low alkylimino group and A, X, $R_1$, $R_2$, $R_3$ and Z have the meanings given for general Formula I or IX, respectively. The reduction of compounds of general Formulae X and XI, wherein Z is oxygen, can be performed for instance by treatment with a complex hydride, in particular lithium aluminium hydride, in an ether or an ethereal solvent such as, e.g. diethylether, dibutylether or tetrahydrofuran, in the cold or, if necessary, while heating. Electrolytic reduction can be used as another reduction process. The reductive desulphurisation of compounds of the general Formula X or XI can be carried out, e.g. by treating with a hydrogenation catalyst such as Raney nickel, in a low alkanol and, if desired, in the presence of hydrogen, or by means of electrolysis. If desired, the amides of the general Formula X or XI can be converted into the corresponding thioamides with the aid of the usual sulphurising agents such as phosphorus trisulphide or phosphorus pentasulphide etc., followed by reductive desulphurisation, instead of the direct reduction of the amides.

Guanidides of the general Formula X are obtained, for example, by reacting halides of the corresponding carboxylic acids with guanidines or alkyl-substituted guanidines.

The required carboxylic acid halides can be produced in the usual manner from the corresponding alkyl esters already mentioned in connection with the production of amines of the general Formula II.

Starting from N-alkyl-N-(1-adamantyl)-amido- and N-(1-adamantyl)-amidoglycines or from the corresponding homoadamantyl derivatives, for example, guanidino acetic acid amides of the general Formula XI can be obtained by employing these amino acid amides instead of the amines of the general Formula II in the first or second process given above for the production of the end products of general Formula I. The conversion of carboxylic acid derivatives of the general Formulae X and XI into the corresponding thiocarboxylic acid derivatives has already been mentioned.

Finally, compounds of the general Formula I can also be obtained by reacting a reactive ester of the general Formula XII

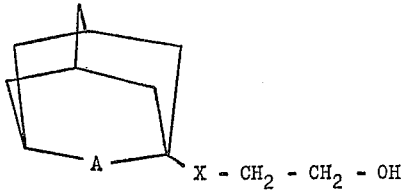

(XII)

wherein A and X have the meanings given for general Formula I, in particular an arylsulphonic acid ester or the methane sulphonic acid ester or a halide with a compound of the general Formula XIII

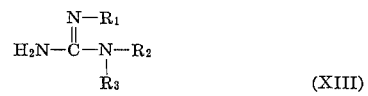

(XIII)

wherein $R_1$, $R_2$ and $R_3$ have the meanings already given, or with an acid addition salt thereof.

The reaction is performed, for example, by boiling both the reaction components in a solvent such as e.g. tert. butanol. Compounds of the general Formula XII are obtained, e.g. by reacting low alkyl esters of adamant-1-yloxy, adamant-1-thio, adamant-1-ylimino, adamant-1-ylalkylimino acetic acid or of homo-adamantyl derivatives with lithium aluminum hydride. The necessary esters are formed, in their turn, by reacting 1-mercapto-, 1-amino-, 1-alkylamino- or 1-hydroxy-adamantane or the corresponding 1-homoadamantyl derivatives with chloro- or bromoacetic acid alkyl esters. The conversion of the compounds of the general Formula XII into their reactive esters is performed in the usual manner by reacting with p-toluenesulphonylchloride, methane-sulphonyl chloride, phosphorus penachloride or phosphorus tribromide.

The new guanidine derivatives are strong bases. With inorganic and organic acids they form monoacid salts or, if X is the imino group or a low alkylimino group, also diacid salts. Hydrochloric acid, hydrobromic acid, sulphuric acid, phosphoric acid, methane sulphonic acid, ethane disulphonic acid, β-hydroxy-ethane sulphonic acid, acetic acid, lactic acid, oxalic acid, succinic acid, fumaric acid, maleic acid, malic acid, tartaric acid, citric acid, benzoic acid, salicyclic acid, phenylacetic acid and mandelic acid, for example, are suitable for salt formation.

The new guanidine derivatives and their non-toxic salts can be administered orally, rectally or parenterally. By non-toxic salts are meant salts with those acids the anions of which are pharmacologically acceptable in the usual dosages, i.e. they have no toxic effects. It is also of advantage if the salts to be used crystallize well and are not or are only slightly hygroscopic.

Dosage units for oral administration preferably contain between 1 and 90% of a compound of the general Formula I or of a non-toxic salt thereof as active ingredient. They are produced, for example by combining the active substance with solid, pulverulent carriers such as lactose, saccharose, sorbitol, mannitol; starches such as potato starch, maize starch or amylopectin, also laminaria powder or citrus pulp powder; cellulose derivatives or gelatines, optionally with the addition of lubricants such as magnesium or calcium stearate or polyethylene glycols (carbowaxes) of suitable molecular weights to form tablets or dragée (sugar coated tablet) cores. The latter are coated, e.g. with concentrated sugar solutions which can also contain gum arabic, talcum and/or titanium dioxide, or with a lacquer dissolved in volatile organic solvents or mixtures of solvents. Dyestuffs can be added to these coatings e.g. to distinguish between different dosages of active substance.

Dosage units for rectal administration are, e.g. suppositories which consist of a combination of an active substance with a neutral fatty foundation, or also gelatine rectal capsules which contain a combination of the active substance with polyethylene glycols (carbowaxes) of suitable molecular weight.

Ampoules for parenteral, particularly intramuscular, administration preferably contain as active substance a water soluble salt of a guanidine derivative of the general Formula I in a concentration of, preferably, 0.5–5%, optionally together with suitable stabilising agents and buffer substances, in aqueous solution.

The following examples illustrate the production of the new compounds of general Formula I and of intermediate products which have not been described hitherto, but they are by no means the only methods of producing same. The temperatures are given in degrees centigrade.

*Example 1*

(a) 14.5 g. (69 millimol) of adamant-1-oxy-acetic acid, cf. Belgian Patent No. 644,741, are refluxed for 1 hour with 58 ml. of freshly distilled thionyl chloride. After evaporating, 100 ml. of benzene are added to the residue, the latter is evaporated off and the crude acid chloride which remains is dissolved in 100 ml. of absolute dioxan. This solution is added dropwise at 0° to 200 ml. of saturated aqueous ammonia solution whereupon the amide formed precipitates. Filtration, solution of the crystals in 200 ml. of methylene chloride, drying of the solution over magnesium sulphate, concentration and recrystallisation of the residue from hexane yields adamant-1-yloxy-acetic acid amide as colourless crystals, M.P. 120–123°

33.5 g. (160 millimol) of adamant-1-yloxy-acetic acid amide in 340 ml. of absolute tetrahydrofuran are added dropwise to a refluxing suspension of 12.1 g. (319 millimol) of lithium aluminum hydride in 2000 ml. of ether. The mixture is then refluxed for 12 hours, then cooled. 100 ml. of ethyl acetate are added dropwise and finally 2 N sulphuric acid is added dropwise until there is an acid reaction. The aqueous phase is removed, washed twice with 500 ml. of ether each time and made alkaline with concentrated sodium hydroxide solution and ice in the presence of 500 ml. of ether. The aqueous phase is extracted twice with 500 ml. of ether each time, the ethereal solutions are combined, washed with water, dried over potassium carbonate and concentrated whereupon β-(adamant-1-yloxy)-ethylamine remains as an oil.

(b) 7.4 g. (38 millimol) of β-(adamant-1-yloxy)-ethylamine and 10.8 g. (76 millimol) of finely pulverised methylisothiuronium hydrogen sulphate in 150 ml. of ethanol/water 1:1 are refluxed for 24 hours. After concentrating to 75 ml., the reaction mixture is filtered. The filter residue is washed three times with ethanol and then dissolved in 2 N sodium hydroxide solution. N-[β-(adamant-1-yloxy)-ethyl]-guanidine is isolated by reacting the solution three times with 100 ml. of methylene chloride each time, washing the combined organic solutions with saturated sodium chloride solution, drying over potassium carbonate and evaporating.

The product is dissolved in 40 ml. of methanol and converted into the hydrochloride by the addition of ethereal hydrogen chloride solution. M.P. 184–185°. N-[β-(homoadamant-1-oxy)-ethyl]-guanidine is obtained by repeating Example 1 but using an equivalent amount of homoadamant-1-oxy-acetic acid as starting material.

By repeating step (b) above, but using in lieu of methylisothiuronium hydrogen sulfate an equivalent amount of N,N′,S-trimethyl-thiuronium hydrogen sulfate, there is obtained N-[β-(adamant-1-oxy)-ethyl]-N,N″-dimethyl-guanidine.

*Example 2*

(a) 9.0 g. (40 millimol) of adamant-1-ylthio-acetic acid, M.P. 68–70°, cf. French Patent No. 1,350,317, in 40 ml. of distilled thionyl chloride are refluxed for 30 minutes. The excess thionyl chloride is evaporated off under vacuum, benzene is added to the residue and the resultant mixture is again evaporated. The crude acid chloride which remains is dissolved in 80 ml. of dioxan and the solution is added dropwise at 0° to 200 ml. of saturated aqueous ammonia solution. After diluting with water, the precipitated crude amide is filtered off, taken up in 200 ml. of methylene chloride and the solution is dried over magnesium chloride and concentrated. After drying, adamant-1-ylthio-acetic acid amide is obtained, M.P. 130–131°.

A solution of 6.0 g. (27 millimol) of adamant-1-ylthio-acetic acid amide in 300 ml. of abs. ether is added dropwise to 3.5 g. (92 millimol) of lithium aluminum hydride in 100 ml. of abs. ether which are being refluxed and stirred. After stirring for 24 hour at reflux temperature it is cooled to 0°, and then 100 ml. of ethyl acetate and afterwards 200 ml. of 2 N sulphuric acid are added dropwise. The organic phase is removed and the aqueous phase is washed twice with 100 ml. of ether each time. The acid aqueous solution, in the presence of 300 ml. of ether, is made alkaline with concentrated sodium hydroxide solution, the phases are separated and the alkaline phase is extracted three times more with 100 ml. of ether each time. On drying the combined extracts over potassium carbonate and evaporating, β-(adamant-1-ylthio)-ethylamine is obtained as a pale yellow oil (structure verified by IR and NMR spectra).

(b) The above amine is obtained by a second process as follows: 33.8 g. (0.2 mol) of 1-mercapto-adamantan in 500 ml. of diethylene glycol dimethyl ether are heated at 150° under an atmosphere of nitrogen and then 36 ml. of sodium amide suspension (content 11.7 g. of sodium amide, 0.3 mol) in toluene are added in portions. After refluxing for 5 hours, 72.5 g. (0.4 mol) of β-bromo-propionic acid ethyl ester are added dropwise within 5 minutes and the mixture is refluxed for another 14 hours. After cooling to 20°, 50 ml. of ethanol are added dropwise, the mixture is poured into 1000 ml. of ice water and finally extracted three times with 1000 ml. of ether each time. The combined ether extracts are washed twice with 1500 ml. of water each time, dried over magnesium sulphate and concentrated. Distillation of the residue yields β-(adamant-1-ylthio)-propionic acid ethyl ester as a pale oil, B.P. 160–165°/0.7 torr, $n_D^{25°}$ 1.5185. The ester is saponified by refluxing for 4 hours with a mixture of 1000 ml. of ethanol, 40 g. of solid sodium hydroxide and 10 ml. of water, then cooling the solution and concentrating. The residue is boiled with active charcoal and Hyflo® (diatomaceous earth) in 500 ml. of water, the suspension is filtered, the filtrate is cooled and acidified with concentrated hydrochloric acid whereupon the β-(adamant-1-ylthio)-propionic acid precipitates in crystalline form. It is filtered off, taken up in methylene chloride and the solution is dried over magnesium sulphate and concentrated. The β-(adamant-1-ylthio)-propionic acid which remains is purified by recrystallisation from hexane; M.P. 108–110°, $pK_{MCS}$ 6.8.

(c) 2.4 g. (10 millimol) of β-adamant-1-ylthio)-propionic acid and 12 ml. of thionyl chloride are boiled for 10 minutes. The excess reactant is distilled off, toluene is added to the crude acid chloride which remains and, after distilling off the toluene, the acid chloride is dissolved in 20 ml. of acetone and this solution is added at 10° to the solution of 6.5 g. (100 millimol) of sodium azide in 20 ml. of water. After stirring for 1 hour, 200 ml. of ice water are added to the mixture which is then made alkaline with sodium carbonate solution and extracted twice with 200 ml. of ether/benzene 1:1 each time. The combined extracts are washed with 200 ml. of ice water, dried over magnesium sulphate and concentrated to a volume of 50 ml. at 30°. This solution is then added to 100 ml. of boiling ethanol and the whole is refluxed for 2 hours. On evaporating the mixture, 2.9 g. of crude urethane are obtained. This is refluxed for 3 hours with a mixture of 3 g. of potassium hydroxide, 2.5 ml. of water and 50 ml. of ethylene glycol. The reaction mixture is diluted with 200 ml. of water, made acid with 2 N hydrochloric acid and extracted three times with 100 ml. of ether/benzene 1:1 each time. The aqueous phase is made alkaline with concentrated sodium hydroxide solution in the presence of ether and, after removal of the ether, is extracted three times with 100 ml. of the same solvent each time. After drying the ether extracts over potassium carbonate and concentrating, β-(adamant-1-ylthio) ethylamine is obtained as an oil. This is identical in the IR and NMR spectra and also the thin layer chromatogram with the product described under (a).

(d) 7.0 g. (33 millimol) of β-(adamant-1-ylthio)-ethylamine and 6.9 g. (50 millimol) of methylisothiuronium hydrogen sulphate in 300 ml. of ethanol/water 1:1 are refluxed for 4 hours. The mixture is then cooled. 300 ml. of water and 3 g. of active charcoal are added. The whole is boiled and filtered hot. On cooling the filtrate, the sulphate of N-[β-(adamant-1-ylthio)-ethyl]-guanidine crystallises out. It is filtered off, suspended in 100 ml. of chloroform and concentrated sodium hydroxide solution is added. The organic phase is removed, dried over potassium carbonate and concentrated. Hydrochloric acid/isopropanol are added to the base which remains and the N-[β-(adamant-1-ylthio)-ethyl]-guanidine hydrochloride is crystallised by the addition of ether. M.P. 160–165°.

By repeating step (d), but using in lieu of methylisothiuronium hydrogen sulfate an equivalent amount of N,N',S-trimethyl-thiuronium hydrogen sulfate, there is obtained N-[β-(adamant-1-ylthio)-ethyl]-N,N''-dimethyl-guanidine.

*Example 3*

(a) 11.3 g. (0.1 mol) of chloroacetic acid chloride are added dropwise to a solution, stirred at 20°, of 15.1 g. (0.1 mol) of 1-amino-adamantane and 15 ml. of triethyl-amine in 250 ml. of methylene chloride. After stirring for 4 hours, the red-yellow solution is concentrated in vacuo, the residue so obtained is dissolved in 200 ml. of benzene and washed with 2 N hydrochloric acid, water, potassium bicarbonate solution and then again with water. The organic phase is removed, dried over magnesium sulphate and evaporated. On recrystallising the residue from 100 ml. of ethanol/water 9:1, chloroacetic acid-N-(1-adamantyl)-amide is obtained, M.P. 119–121°.

A solution of 25 g. (0.38 mol) of sodium azide in 120 ml. of water is added at 20° to 8.5 g. (37 millimol) of chloroacetic acid-N-(1-adamantyl)-amide dissolved in 240 ml. of acetone and the whole is stirred for 20 hours at 50°. The acetone is then distilled off and the aqueous solution which remains is extracted three times with 250 ml. of ether each time. The combined ether extracts are dried over magnesium sulphate and concentrated. On recrystallising the residue from 70 ml. of n-hexane, azidoacetic acid-N-(1-adamantyl)-amide is obtained, M.P. 93–94°.

8.0 g. (34 millimol) of azidoacetic acid-N-(1-adamantyl)-amide are dissolved in 160 ml. of abs. ether, the solution is added dropwise to a solution of 6.5 g. (172 millimol) of lithium aluminum hydride in 200 ml. of abs. ether while stirring vigorously and the whole is refluxed for 16 hours. After cooling to 0°, first about 100 ml. of ethyl acetate and then 200 ml. of 2 N sulphuric acid are added dropwise while stirring. The ether is removed from the acid aqueous phase which is then washed twice with 100 ml. of ether each time and finally made alkaline with concentrated sodium hydroxide solution and ice in the presence of 300 ml. of methylene chloride. N-(1-adamantyl)-ethylenediamine is obtained by extracting three times with 300 ml. of methylene chloride each time, drying the combined organic solutions over potassium carbonate and concentrating. It is an almost colourless oil, the structure of which is confirmed by IR and NMR spectra.

(b) 7.2 g. (52 millimol) of finely pulverised methylisothiuronium hydrogen sulphate are added to a stirred solution of 5.0 g. (26 millimol) of N-(1-adamantyl)-ethylenediamine in 100 ml. of ethanol and the whole is refluxed for 6 hours. After cooling, the reaction mixture is diluted with 100 ml. of ethanol, filtered and the filter residue is washed with ethanol. 60 ml. of concentrated sodium hydroxide solution are added to the crystals so obtained which are then stirred with 200 ml. of methylene chloride for 30 minutes. The organic phase is removed and the aqueous phase is washed with methylene chloride. The combined methylene chloride solutions are dried over potassium carbonate and concentrated. The N-[β-(adamant-1-ylamino)-ethyl]-guanidine which remains is converted with ethereal hydrogen chloride solution into the dihydrochloride which melts above 270°.

By repeating Example 3, but using in lieu of 1-amino-adamantane in step (a) an equivalent amount of 1-methyl-amino-adamantane, there is obtained as final product N-[β-(adamant-1-yl-methylamino)-ethyl]-guanidine.

*Example 4*

1.95 g. (10 millimol) of β-(adamant-1-yloxy)-ethylamine and 2.01 g. (10 millimol) of 1-amidino-3,5-di-methyl-pyrazole nitrate (1-guanyl-3,5 - dimethyl-pyrazole nitrate) are refluxed for 2 hours in 40 ml. of ethanol. After evaporating this is extracted with 20 ml. of ether and the residue so obtained is worked up as in Example 1 (b), and converted into the hydrochloride; M.P. 184–186°.

*Example 5*

2.32 g. (10 millimol) of β-(adamant-1-yloxy)-ethylamine hydrochloride and 630 mg. (15 millimol) of cyanamide are refluxed for 4 hours in 25 ml. of ethanol and, after evaporation to 10 ml., cooled and filtered. The filter residue is worked up as in Example 1 (b) and converted into the hydrochloride; M.P. 184–185°.

*Example 6*

1.95 g. (10 millimol) of β-(adamant-1-yloxy)-ethylamine and 810 mg. (10 millimol) of sodium thiocyanate in 20 ml. of water are heated for 2 hours on a steam bath with vigorous stirring. The solution is then evaporated in vacuo and 20 ml. of 15% ammonia solution and approximately 1500 mg. of freshly precipitated mercury oxide are added to the residue. It is warmed for one hour on a steam bath with vigorous stirring, filtered and washed several times with methylene chloride. The filtrate is made strongly alkaline with concentrated potassium hydroxide solution and extracted three times with methylene chloride. The combined organic extracts are worked up as in Example 1 (b) and converted into the hydrochloride; M.P. 184–185°.

Example 7

When mixing 1.95 g. (10 millimol) of β-(adamant-1-yloxy)-ethylamine and 1.6 g. (15 millimol) of cyanogen bromide in 50 ml. of ether, the corresponding cyanamide hydrobromide is formed. It is filtered off and 2.64 g. of ammonium sulfate in 20 ml. of 15% ammonia solution is added to the filter residue so obtained.

This mixture is heated to 140° for 4 hours in a sealed tube while shaking. After cooling, concentrated potassium hydroxide solution is added to the reaction mixture which is then extracted with methylene chloride and worked up as in Example 1 (b) and the product is converted into the hydrochloride of N-[β-(adamant-1-yloxy)-ethyl]-guanidine; M.P. 184–185°.

By repeating Example 7, but using an equivalent amount of dimethyl-ammonium sulfate in lieu of ammonium sulfate, there is obtained N-β-(adamant-1-yloxy)-ethyl-N'-N'-dimethyl guanidine.

Example 8

3.16 g. of sodium hydride (50% in mineral oil) and 1.15 g. (7.3 millimol) of guanidine hydrosulfate are refluxed for half an hour in 140 ml. of tert. butanol and then filtered free from insoluble sodium sulfate through Hyflo® while still hot. After adding 2-(adamant-1-yloxy)-ethyl-1-tosylate melting at 110–112°, the mixture is boiled for 7 hours. After cooling, it is evaporated to dryness in vacuo, rendered strongly alkaline with 50 ml. of 2 N sodium hydroxide solution and extracted with four 70 ml. portions of methylene chloride. The combined extracts are dried over potash and are evaporated. The residue is dissolved in 10 ml. of ethanol and 2 N ethereal hydrochloric acid is then added thereto. After standing for 24 hours at −4° the hydrochloride crystallises; it melts at 185–187° after recrystallisation from sec. butanol and ethyl acetate.

Example 9

(a) 4.95 g. of homoadamant-1-ylamine (30 millimol) are dissolved in 80 ml. of dry benzene and 4.04 g. of triethylamine (40 millimol). 3.4 g. of chloroacetyl chloride (30 millimol) in 20 ml. of dry benzene are then added dropwise to the solution for 10 minutes at 5–10° while stirring and cooling with ice. The reaction mixture is left to stand overnight at room temperature, then washed in a separating funnel with water, then with 2 N hydrochloric acid and finally with dilute sodium carbonate solution. After drying over magnesium sulphate, the organic phase is evaporated and the remaining crude product is crystallised twice from hexane; M.P. 95–97°.

(b) 3.9 g. of chloroacetic acid-N-(homoadamant-1-yl) amide (16.2 millimol) are dissolved in 80 ml. of acetone and added to 5.2 g. of sodium azide (80 millimol) dissolved in 26 ml. of water, at room temperature. This solution is heated for 15 hours, while stirring, to 50–70° in a reflux condenser.

After this time, the acetone is removed in vacuo at 30°, the precipitated oil is taken up in 100 ml. of benzene-ether (1:1) and this organic phase is washed twice with 100 ml. of water each time. After drying over magnesium sulphate and removing the solvent in vacuo at 30°, a yellow oil remains in a quantitative yield and is further used without additional purification.

(c) 3.7 g. (14.9 millimol) of azidoacetic acid-N-(homoadamant-1-yl) amide are dissolved in 50 ml. of absolute tetrahydrofuran and added dropwise with vigorous stirring and with ice cooling, to 2.3 g. of lithium aluminum hydride (in 50 ml. of tetrahydrofuran). The solution is then refluxed for 20 hours. After cooling to 5°, 12 ml. of 1 N sodium hydroxide are added dropwise; the reaction mixture is removed by suction and washed with tetrahydrofuran. The filtrate is evaporated. The residue is taken up twice with benzene and evaporated to dryness. The product is an almost colourless oil the structure of which is substantiated by IR and NMR spectra.

(d) 1.15 g. (8.28 millimol) of finely pulverised methylisothiuronium hydrogensulphate are added to a solution of 0.8 g. (4.12 millimol) of N-(1-homoadamantyl) ethylene diamine in 25 ml. of ethanol while stirring and refluxed for 6½ hours. After cooling the residue is removed by suction and washed with ethanol. The white filter residue obtained is shaken for 15 minutes in 30 ml. of concentrated potassium hydroxide solution and 50 ml. of methylene chloride. The organic phase is separated and the aqueous phase is washed with methylene chloride. The combined methylene chloride solutions are dried over sodium carbonate and evaporated. The remaining N-[β-(homoadamant-1-ylamino)-ethyl] guanidine is converted into the dihydrochloride by means of ethereal hydrochloric acid solution. The melting point is over 250°.

By using instead of methylisothiuronium hydroxysulfate, an equivalent amount of N,N',S-trimethyl-thiuronium hydrogen sulfate and otherwise repeating step (d), supra, there is obtained N-[β-(homo-adamant-1-ylamino) ethyl]-N',N''-dimethyl-guanidine.

We claim:

1. A compound selected from those of the formula

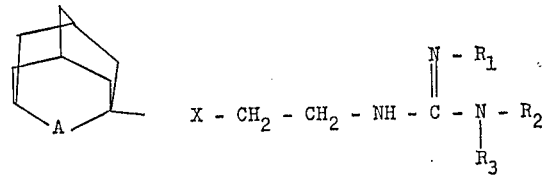

wherein
A represents methylene or ethylene,
X represents oxygen, sulfur, imino or lower alkylimino,
$R_1$, $R_2$ and $R_3$ represent hydrogen or at most two of these three symbols represent lower alkyl and non-toxic acid addition salts thereof.

2. N-[β-(adamant-1-yloxy)ethyl]-guanidine.
3. N-[β-(homoadamant-1-yloxy)-ethyl]-guanidine.
4. N-[β-(adamant-1-ylthio)-ethyl]-guanidine.
5. N-[β-(adamant-1-ylamino)-ethyl]-guanidine.
6. N-[β-(homoadamant - 1 - ylamino) - ethyl]-guanidine.

No references cited.

CHARLES B. PARKER, *Priamry Examiner.*
ROBERT V. HINES, *Assistant Examiner.*